Nov. 21, 1972  R. I. WOLKOWICZ  3,703,569
CORONA TREATMENT OF ANTISTAT CONTAINING SHEET
OF ETHYLENE OR ETHYLENE COPOLYMER
Filed March 23, 1970

INVENTOR.
Richard I. Wolkowicz
BY
John A. Weygandt
ATTORNEY.

United States Patent Office 3,703,569
Patented Nov. 21, 1972

3,703,569
CORONA TREATMENT OF ANTISTAT CONTAINING SHEET OF ETHYLENE OR ETHYLENE COPOLYMER
Richard I. Wolkowicz, Clarksboro, N.J., assignor to Scott Paper Company, Delaware County, Pa.
Filed Mar. 23, 1970, Ser. No. 21,954
Int. Cl. B29d 7/20; H05f 1/02
U.S. Cl. 264—22      4 Claims

ABSTRACT OF THE DISCLOSURE

A method of preparing a sheet comprising thermoplastic polymeric material selected from polyethylene and copolymers of ethylene and propylene and an antistatic agent which includes the step of subjecting the sheet to corona treatment, whereby the static decay rate of the sheet is increased. The amount of antistat is at least the amount which gives an adequate static decay rate to the sheet after being modified by corona treatment but less than the amount sufficient to produce a measurable increase in the static decay rate of the sheet in the absence of corona treatment.

BACKGROUND OF THE INVENTION

Field of the invention

Figure 1:
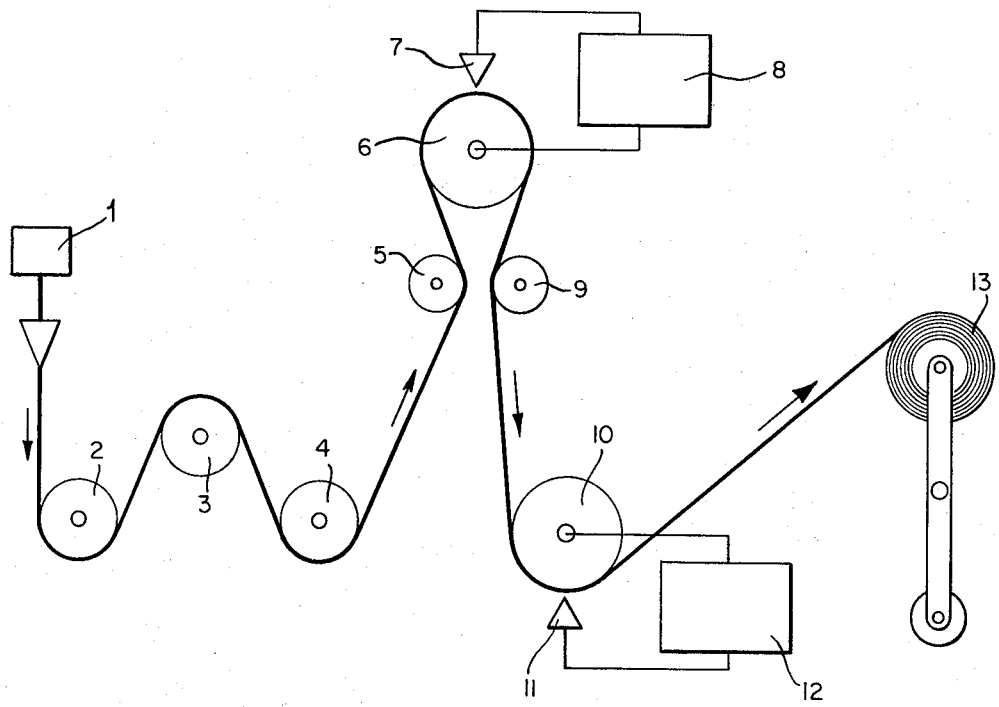

This invention relates to thermoplastic polymeric sheet material which contains an antistatic agent and which is subjected to corona treatment.

Description of the prior art

The buildup of static electricity on thermoplastic polymeric film and sheet material causes many problems to be encountered in high speed processing, converting, printing and packaging operations. When such polymeric or "plastic" sheets or films (hereinafter "sheets") are rubbed together or over a material of different composition, they accumulate an electrostatic charge which causes the sheets to cling to each other or "block." This problem is especially troublesome in the handling of plastic sheets, for when they adhere to each other because of the static charges, the sheets do not feed properly through the machinery used for printing and stacking such sheets. The electrostatic build-up can be so substantial as to cause severe shocks to machine operators and to generate sparks which, flammable vapors are present, can cause explosions or fires. In addition, accumulated charges can be troublesome in that not only do they make the sheets difficult to manipulate, they greatly increase the tendency for the sheets to accumulate dust on their surfaces. Accordingly, much effort has been devoted to eliminating or reducing the magnitude of accumulated electrostatic charges on thermoplastic polymeric sheets.

Many methods have been proposed to reduce the accumulation of static charges, among them being the internal modification of the synthetic resin compositions. Such internal modification is generally preferable to any surface treatment or coating wherever surface wear is a consideration, because of the permanency achieved with the former. Internal modification is accomplished by adding to the synthetic resin composition an antistatic agent, which should be at least temporarily dispersible in the synthetic resin composition and stable at the temperatures at which the synthetic composition is processed. The mechanism by which an internal antistatic agent operates is not fully understood at the present time. Its effect, however, is to accelerate the rate at which static charges "decay," or are dispersed from the sheet.

While many such antistatic agents are satisfactory in preventing the accumulation of static charges on plastic sheets, it is often necessary to add an amount of the antistatic agent (antistat) which affects other properties of the plastic composition and, in particular, imparts a nonadherent character to the plastic surface. As a result, when inks, adhesives, or other coating materials are applied to the surface it is found that the applied material fails to adhere. Furthermore, the concentration of internal antistat sanctioned by the Food and Drug Administration for film and sheeting used in food packaging applications is frequently insufficient to prevent electrostatic attraction and adhesion.

SUMMARY OF THE INVENTION

Accordingly, it is an object of the present invention to provide a process for reducing the tendency of thermoplastic polymeric film and sheet material to accumulate electrostatic charges.

A further object of the invention is to provide a method for suppressing electrostatic accumulation on thermoplastic polymeric film and sheet material by incorporating into the resin composition an antistatic agent, without impairing the adherence of coating materials to the surface of the material.

Figure 2:
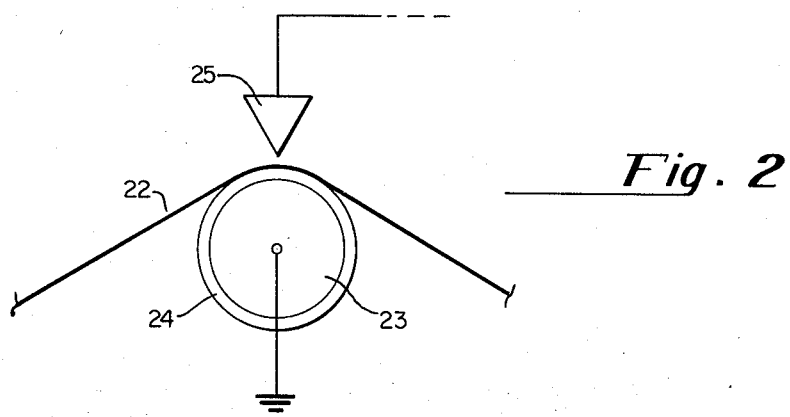

Other objects, features and advantages of the invention will become more readily understood from the following detailed description taken in conjunction of the appended claims and attached drawings in which:

FIG. 1 is a schematic representation of apparatus suitable for practice of the present invention, and FIG. 2 is a detailed view of part of the apparatus shown in FIG. 1.

In accordance with the present invention, a sheet or film (hereinafter sheet) comprising thermoplastic polymeric material and an antistat is prepared in a manner whereby the static decay rate of the sheet is optimized while the concentration of the antistat is minimized. This preparation is accomplished by combining with a thermoplastic polymeric resin, and in particular a polyolefin resin, an antistat which is normally effective in enhancing the static decay rate of the sheet and which is preferably selected from the group consisting of tertiary amines, anionic phosphate esters, quaternary ammonium halides, sulfonated aliphatic hydrocarbons, and combinations thereof. Further in accordance with the invention, the antistat is present in an amount less than that which is normally employed to adequately prevent the accumulation of static charges.

This novel result is obtained by subjecting the antistat-containing sheet to corona treatment. The corona treatment acts in some manner not understood by the present inventor to increase the effectiveness of the antistat compound, whereby the sheet, which contains less than the amount of antistat normally employed in the absence of corona treatment to adequately prevent the accumulation of static charges, exhibits a rapid rate of static decay. Even a sheet containing an amount insufficient to produce a measurable increase in its static decay rate, after corona treatment, exhibits a static decay rate typical of a sheet containing the larger amount of antistat agent which prevents the accumulation of static charges without corona treatment. This novel effect of the corona treatment is not seen in the absence of antistat. As a further advantage of the invention, since the concentration of antistat can be made very low, the adherence of coating materials to the surface of the sheet is unimpaired.

These and other principles, features and advantages of the invention will be further understood from a consideration of the following detailed description.

DETAILED DESCRIPTION

In practicing the method of the present invention, a thermoplastic resin is combined with an antistat, and as desired, a filler, pigment, plasticizer, or any other additive—depending on the characteristics sought in the final product. The resulting resinous composition is shaped into the form of a sheet by any suitable means known in the art to which this invention pertains, such as by extruding, calendering, or casting. In a preferred embodiment, a polyolefin is blended, by means of, for example, a Banbury mixer, with an antistat and other ingredients, and extruded into the form of a sheet. The corona treatment may be applied at any time after the sheet is formed, but is most conveniently performed immediately subsequent to the extrusion step. When the sheets are to be stacked, it is preferred that both sides of the sheet be subjected to corona treatment.

Referring now to FIG. 1, the sheet is formed by a suitable extruding device 1 and passed over chill rolls 2, 3 and 4. From thence the product passes over takeup roll 5 to the treater roll 6. The treater roll is usually covered with a suitable dielectric material such as epoxy, fluorinated polyethylene (Teflon), chlorinated polyethylene (Hypalon), or polyester (Mylar). The electrode or corona bar 7 is suspended parallel to the treater roll 6 at about $\frac{1}{16}''$ above roll. The corona bar 7 is energized by a transformer and corona treating power source 8. In one specific embodiment, the corona treater is a Lepel Treater Unit HFSG–2 manufactured by the Lepel High Frequency Laboratories, Inc., New York, N.Y. The output frequency of this unit is 450 kilohertz and the maximum power output is 1.3 kilowatts. The electrode is a threaded $\frac{3}{8}$ inch cadmium-plated steel rod.

The relationship of the treater bar and the sheet to the treater roll is shown in greater detail in FIG. 2 where the film 22 passes over the roll 23 provided with roll cover 24 with the treater bar 25 suitably staged above the film 22. As the sheet passes over the roll, a surface of it is subjected to the action of the free radicals formed by the corona which occurs between the treater bar 25 and the treater roll 23.

Referring again to FIG. 1, the sheet continues past a tension roll 9 to a second treater roll 10 and a second electrode or corona treater bar 11 connected to a second transformer and corona treating power source 12 where the opposite surface of the sheet is subjected to corona treatment. The sheet then proceeds to windup roll 13.

The following specific embodiments more fully illustrate the operation of the present invention.

EXAMPLE 1

Three levels of an antistat, ARMOSTAT 310, and N,N' bis (2-hydroxyethyl) alkyl amine marketed by Armour Industrial Chemical Company, Chicago, Ill. 50590, were blended with high-density (0.96 g./cc.) polyethylene having a melt index of 1.0 (as measured by ASTM standard test D1238–62T hereinafter referred to as "ASTM"), and titanium dioxide ($TiO_2$) powder, the amount of the $TiO_2$ being 10% by weight of the polyethylene. Each formulation was extruded into the form of a sheet having a thickness of 5–6 mils. Immediately after extrusion, a sample extruded from each formulation was corona treated at a power setting of 0.145 kilowatt on the Lepel treater above-described. After allowing both treated and untreated samples to age for two days, the static decay rates of both were measured. These rates were determined by applying a charge of static electricity to the sheet and recording the time required at 60% relative humidity and 70° F. for the charge to decay to half of its original value, i.e., the "half-life" of the static charge. The results are presented in Table Ia below.

TABLE Ia

| Weight percent antistat | Static decay half-life in seconds with corona treatment | Half-life in seconds without corona treatment |
|---|---|---|
| 0 | | 6,800 |
| 0 | 6,800 | |
| 0.5 | | 1,600 |
| 0.5 | 26 | |
| 0.7 | | 26 |
| 0.7 | 26 | |

While some reduction in static charge half-life is obtained without corona treatment at a concentration of 0.5 weight-percent, such a level of the tertiary amine antistat adversely affects the adherence of certain types of inks and glues used in printing and binding. In particular, for the use of an animal-glue type of hot-melt adhesive, Driflex 100 sold by Brockton Adhesive, Inc., East Providence, R.I. 02916, an antistat concentration below 0.17 is required for satisfactory adhesion. To ensure good bonding, a concentration below 0.10 is preferred. Therefore, in accordance with the objects of this invention, the relationship between antistat concentration and corona treatment is further illustrated at levels below 0.10% in the polyethylene formulation described above. The results, after extrusion, treating and aging are given in the following table.

TABLE Ib

| Weight percent antistat | Corona power (kilowatts) | Half-life in seconds |
|---|---|---|
| 0 | 0 | 6,800 |
| 0 | 0.145 | 6,800 |
| 0.04 | 0 | 6,800 |
| 0.04 | 0.145 | 480 |
| 0.04 | 0.285 | 480 |
| 0.08 | 0 | 6,800 |
| 0.08 | 0.145 | 375 |

As may be seen from the above, at the concentrations tested, neither the corona treatment alone nor the antistat alone reduces the static half-life. When corona treatment is applied to a polyethylene material containing an antistat, even though that amount be extremely small, there is a substantial increase in the static decay rate.

In this connection, it is to be noted that antistats of the type which include ARMOSTAT 310 are sanctioned by the Food and Drug Administration for film and sheeting used in food packaging applications at use levels not to exceed 0.1 percent by weight. (29 Federal Register 3523, Mar. 19, 1964, Section 121.2527.) As may be seen from Table Ib, at these concentrations, static decay rates of material in accordance with the invention are approximately one order of magnitude (ten times) greater than material which has not been corona treated.

EXAMPLE 2

Several levels of ARMOSTAT 310 were blended with a polyallomer consisting of a copolymer of ethylene and propylene which has a density of 0.896 g./cc. and a melt index of 2.0 (ASTM), and titanium dioxide ($TiO_2$) powder, the amount of the $TiO_2$ being 10% by weight of the polyallomer. Each formulation was extruded into the form of a sheet having a thickness of 5–6 mils. Immediately after extrusion, a sample extruded from each formulation was corona treated. After allowing both treated and untreated samples to age for two days, the static decay rates of all samples were measured for 60% relative humidity and 70° F. The results are presented in Table II below.

TABLE II

| Weight percent antistat | Corona power (kilowatts) | Half-life in seconds |
|---|---|---|
| 0 | 0 | 13,850 |
| 0 | 0.145 | 13,850 |
| 0 | 0.285 | 13,850 |
| 0.05 | 0 | 13,850 |
| 0.05 | 0.145 | 6,800 |
| 0.08 | 0 | 13,850 |
| 0.08 | 0.145 | 160 |
| 0.08 | 0.285 | 160 |

Again, as may be seen from Table II above, at the concentrations tested, neither the corona treatment by itself nor the antistat by itself can reduce the static half-life. When corona treatment is applied to material containing antistat, even though the concentration is extremely low, there is a substantial increase in the static decay rate.

EXAMPLE 3

A variety of antistat compounds were blended with a polyallomer, consisting of a copolymer of ethylene and propylene having a density of 0.896 g./cc. and a melt index of 2.0 (ASTM), and titanium dioxide ($TiO_2$) powder, the amount of the $TiO_2$ being 10% by weight of the polyallomer. Each formulation was extruded into the form of a sheet having a thickness of 5–6 mils. Immediately after extrusion, a sample extruded from each formulation was corona treated at a power setting of 0.145 kilowatt on the Lepel treater above-described. After allowing both treated and untreated samples to age for at least 24 hours, the static decay rates of both were measured. These rates were determined by applying a charge of static electricity to the sheet and recording the time in seconds required at 60% relative humidity and 70° F. for the charge to decay to half of its original value, i.e., the "half-life" of the static charge. The results are presented in Table III below.

While the invention has been particularly shown and described with reference to preferred embodiments thereof, it is understood that various other changes and modifications thereof will occur to a person skilled in the art without departing from the spirit and scope of the invention as defined by the appended claims.

What is claimed is:

1. The method of preparing a sheet which comprises polymeric material comprising the steps of:
   (a) combining an antistat taken from the group consisting of a tertiary amine, an anionic phosphate ester, a quaternary ammonium halide, and a sulfonated aliphatic hydrocarbon with a resin taken from the group consisting of polyethylene and copolymers of ethylene and propylene, the amount of antistat being at least the amount which gives an adequate static decay rate to the sheet after being modified by corona treatment but less than the amount sufficient to produce a measurable increase in the static decay rate of the sheet in the absence of corona treatment;
   (b) shaping the combination into the form of a sheet; and
   (c) subjecting at least one surface of the sheet to corona treatment.

2. The method in accordance with claim 1 wherein the antistat is present in an amount less than that which, in the absence of corona treatment, produces a static decay rate which provides a static charge half-life of less than 6800 seconds.

3. The method in accordance with claim 2 wherein the antistat is a tertiary amine present in an amount less than 0.1 percent by weight.

4. The method in accordance with claim 1 wherein both surfaces of the sheet are subjected to corona treatment.

TABLE III

| Trade name | Chemical name or type | Antistat concentration (weight percent) | Half-life in seconds with corona treatment | Half-life in seconds without corona treatment |
|---|---|---|---|---|
| 1. Gafstat AD-510 [a] | Partial ester of phosphoric acid (anionic antistat). | 1.0 | 2,000 | 13,850 |
| 2. Gafstat AE-610 [a] | do | 1.0 | 4,275 | 6,800 |
| 3. Sipenol T-2 [b] | Ethoxylated tallow amine | 0.1 | 300 | 13,850 |
| 4. Fine Organics [c] 273-F | Tertiary Amine | 0.07 / 0.02 | 2,000 / 2,700 | 13,850 / 13,850 |
| 5. Fine Organics 273-C | Tertiary Amine | 0.5 / 0.1 | 10 / 75 | 13,850 / 13,850 |
| 6. Fine Organics 273-E | Tertiary Amine | 0.5 / 0.1 | 480 / 300 | 13,850 / 13,850 |
| 7. Alcastat [b] | Tertiary Amine | 0.1 | 375 | 13,850 |
| 8. Statexan K-1 [d] | Sulfonated aliphatic hydrocarbon. | 1.0 / 0.25 | 3,125 / 3,125 | 13,850 / 13,850 |
| 9. Cetol [c] | Cetyl dimethyl benzyl ammonium chloride (cationic quaternary ammonium halide). | .25 / .08 | 2,375 / 3,125 | 13,850 / 13,850 |
| 10. Stedbac [c] | Stearyl dimethyl benzyl ammonium chloride (cationic quaternary ammonium halide). | 3.0 / 1.0 | 585 / 920 | 13,850 / 13,850 |

[a] Product of General Aniline & Film Corporation, New York, N.Y. 10020.
[b] Product of Alcolac Chemical Corporation, Baltimore, Md. 21226.
[c] Product of Fine Organics Inc., Lodi, N.J. 07644.
[d] Product of Naftone Inc., New York, N.Y. 10022.

References Cited
UNITED STATES PATENTS

| | | | |
|---|---|---|---|
| 3,341,343 | 9/1967 | Beiswanger | 106—177 |
| 3,369,152 | 2/1968 | Spengler | 317—2 F X |
| 3,474,292 | 10/1969 | Carter | 317—2 R |
| 3,514,498 | 5/1970 | Okazaki | 260—78 S |
| 3,137,806 | 6/1964 | Schweriner | 317—2 F |

DONALD J. ARNOLD, Primary Examiner

P. A. LEIPOLD, Assistant Examiner

U.S. Cl. X.R.

117—93.1 CD; 161—411; 317—2 F